United States Patent
Cully et al.

(10) Patent No.: US 12,293,198 B2
(45) Date of Patent: May 6, 2025

(54) CO-EXECUTION OF AN APPLICATION AMONG A PLURALITY OF COMPUTE NODES THROUGH APPLICATION-LEVEL VIRTUALIZATION

(71) Applicant: VMware, Inc., Palo Alto, CA (US)

(72) Inventors: Aidan Cully, St. Augustine, FL (US); Vance Miller, Raleigh, NC (US); Dušan Veljko, Temerin (RS); Mazhar Memon, Austin, TX (US)

(73) Assignee: VMware LLC, Palo Alto, CA (US)

( * ) Notice: Subject to any disclaimer, the term of this patent is extended or adjusted under 35 U.S.C. 154(b) by 516 days.

(21) Appl. No.: 17/493,741

(22) Filed: Oct. 4, 2021

(65) Prior Publication Data
US 2022/0308936 A1    Sep. 29, 2022

Related U.S. Application Data

(60) Provisional application No. 63/164,955, filed on Mar. 23, 2021.

(51) Int. Cl.
| | |
|---|---|
| *G06F 9/445* | (2018.01) |
| *G06F 9/455* | (2018.01) |
| *G06F 9/50* | (2006.01) |
| *G06F 9/52* | (2006.01) |
| *G06F 9/54* | (2006.01) |

(52) U.S. Cl.
CPC ...... *G06F 9/44521* (2013.01); *G06F 9/44505* (2013.01); *G06F 9/45558* (2013.01); *G06F 9/5016* (2013.01); *G06F 9/5038* (2013.01); *G06F 9/5061* (2013.01); *G06F 9/5088* (2013.01); *G06F 9/52* (2013.01); *G06F 9/54* (2013.01); *G06F 9/546* (2013.01); *G06F 9/547* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 6,351,808 B1 * | 2/2002 | Joy ........................ | G06F 9/3802 712/228 |
| 7,996,648 B2 * | 8/2011 | England .................. | G06F 9/545 711/206 |
| 8,554,867 B1 | 10/2013 | Mueller et al. | |

(Continued)

OTHER PUBLICATIONS

Abadi, M. et al. "TensorFlow: Large-Scale Machine Learning on Heterogeneous Distributed Systems," Preliminary White Paper, Nov. 9, 2015, pp. 1-19.

(Continued)

*Primary Examiner* — Abu Zar Ghaffari
(74) *Attorney, Agent, or Firm* — Kim & Stewart LLP

(57) ABSTRACT

A method for executing an application over a plurality of nodes in each of which an application monitor and a runtime are executing includes executing a first portion of the application by first threads of the runtime of the first node and a second portion of the application by second threads of the runtime of the second node, and under control of the application monitors of the first and second nodes and while executing the first portions and second portions of the application, migrating workloads of one or more of the first threads from the first node to the second node for execution by the second threads.

15 Claims, 17 Drawing Sheets

(56) References Cited

U.S. PATENT DOCUMENTS

| | | | |
|---|---|---|---|
| 9,400,801 B1 | 7/2016 | Aplemakh et al. | |
| 10,261,847 B2 | 4/2019 | Memon et al. | |
| 10,534,639 B2 | 1/2020 | Memon et al. | |
| 10,802,871 B1 | 10/2020 | Memon et al. | |
| 10,810,117 B2 | 10/2020 | Memon et al. | |
| 10,949,211 B2 | 3/2021 | Memon et al. | |
| 2002/0156932 A1* | 10/2002 | Schneiderman | H04L 67/34 719/317 |
| 2006/0143350 A1* | 6/2006 | Miloushev | G06F 13/00 710/242 |
| 2008/0133794 A1 | 6/2008 | Rothman et al. | |
| 2008/0189488 A1* | 8/2008 | DeWitt | G06F 9/5016 711/132 |
| 2009/0083753 A1 | 3/2009 | Tzruya | |
| 2009/0240930 A1* | 9/2009 | Barsness | G06F 9/4405 712/229 |
| 2010/0031252 A1* | 2/2010 | Horwitz | G06F 11/3466 718/1 |
| 2010/0083275 A1 | 4/2010 | Jayamohan et al. | |
| 2012/0131173 A1* | 5/2012 | Ferris | G06F 9/5066 709/224 |
| 2013/0086550 A1 | 4/2013 | Epstein | |
| 2013/0268920 A1* | 10/2013 | Ursal | G06F 8/70 717/131 |
| 2014/0059573 A1 | 2/2014 | Jawa et al. | |
| 2015/0150019 A1 | 5/2015 | Sheaffer et al. | |
| 2017/0123857 A1* | 5/2017 | Khan | G06F 9/5066 |
| 2019/0149399 A1* | 5/2019 | Reed | H04L 41/0897 709/223 |
| 2019/0369975 A1 | 12/2019 | Maor | |
| 2019/0377598 A1* | 12/2019 | Xia | G06F 9/4856 |
| 2020/0133746 A1 | 4/2020 | Cleave et al. | |
| 2021/0011666 A1 | 1/2021 | Cully et al. | |
| 2021/0011777 A1* | 1/2021 | Nassi | G06F 9/45558 |
| 2021/0124822 A1 | 4/2021 | Tiwary et al. | |
| 2021/0133001 A1 | 5/2021 | Bono et al. | |
| 2021/0240768 A1 | 8/2021 | Tiwary et al. | |
| 2021/0303681 A1* | 9/2021 | Lin | G06F 21/52 |

OTHER PUBLICATIONS

Anonymous Author(s), "vSphere Bitfusion: Flexible Virtualization for AI Accelerators," Radio'20, Jun. 15-18, 2020, San Francisco, CA, USA, pp. 1-6.

Anonymous Author(s), "Bitfusion UVM: Distributed Shared Memory for Heterogeneous Computing," Radio'20, Jun. 15-18, 2020, San Francisco, Ca, USA, pp. 1-6.

Anonymous Author(s), "Code Generation Toolchain for API Virtualization and Remoting," Radio'20, Jun. 15-18, 2020, San Francisco, CA, USA, pp. 1-6.

Anonymous Author(s), "Advanced Tracer: Performance Tooling for Distributed Systems," Radio'21, Jun. 15-18, 2021, San Francisco, CA, USA, pp. 1-5.

Anonymous Author(s), "Project Valence: Dynamic Partial Computation Remoting," Radio'21, Jun. 15-18, 2021, San Francisco, CA, USA, pp. 1-7.

Bailey, S. and T. Talpey et al. "The Architecture of Direct Data Placement (DDP) and Remote Direct Memory Access (RDMA) on Internet Protocols," RFC—Informational (RFC 4296), Dec. 2005, pp. 1-22.

Devlin, J. et al. "BERT: Pre-training of Deep Bidirectional Transformers for Language Understanding," arXiv:1810.04805v2, May 24, 2019, 16 pages.

Ike-Nwosu, O. "Inside The Python Virtual Machine," Lean Publishing, Aug. 7, 2020, 125 pages.

Intel Corporation "Intel Infrastructure Processing Units (Intel IPU) and SmartNICs," Product Webpage, 2021, 8 pages, Retrieved from the internet Sep. 16, 2021, URL: https://www.intel.com/content/www/us/en/products/network-io/smartnic.html.

Kirk, D. and W. Hwu: "Chapter 2: CUDA Programming Model [Draft]," 2006-2008, pp. 1-11.

Kulshrestha, R. "Keeping up with the BERTs," Towards Data Science, Oct. 26, 2020, 17 pages, URL: https://towardsdatascience.com/keeping-up-with-the-berts-5b7beb92766.

Paszke, A. et al. "PyTorch: An Imperative Style, High-Performance Deep Learning Library," 33rd Conference on Neural Information Processing Systems (NeurIPS 2019), Vancouver, Canada, 2019, pp. 1-12.

Pinkerton, J. et al. "Direct Data Placement Protocol (DDP) / Remote Direct Memory Access Protocol (RDMAP) Security," RFC—Standards Track (RFC 5042), Oct. 2007, pp. 1-52.

Recio, R. et al. "A Remote Direct Memory Access Protocol Specification," RFC—Standards Track (RFC 5040), Oct. 2007, pp. 1-66.

Vaswani, A. et al. "Attention is All You Need," 31st Conference on Neural Information Processing Systems (NIPS 2017), Long Beach, CA, USA, pp. 1-15.

Learning tensorflow eBook, RIP Tutorial, Sep. 16, 2021, 81 pages, URL: https:/riptutorial.com/ebook/tensorflow.

"Distributed shared memory," Wikipedia, Mar. 14, 2021, 7 pages, Retrieved from the internet Jun. 23, 2021, URL: https://en.wikipedia.org/wiki/Distributed_shared_memory.

Notice of Allowance mailed Jun. 14, 2023 in U.S. Appl. No. 17/493,781, 20 pages.

Non-Final Office Action mailed Jun. 6, 2024 in U.S. Appl. No. 17/493,783, 27 pages.

Unknown Author "Maple 10-input and output," fr.maplesoft.com/supporUhelp/maple/view.aspx?path=ProgrammingGuide%2FChapter10, May 2011, 33 pages. (Year: 2011).

Examiner search note on "what are system calls; file system calls", searched on Sep. 21, 2024, limited to results before 2021, 2 pages (Year: 2024).

Non-Final Office Action mailed Sep. 26, 2024 in U.S. Appl. No. 17/493,794, 39 pages.

Final Office Action mailed Oct. 10, 2024 in U.S. Appl. No. 17/493,783, 39 pages.

* cited by examiner

CO-EXECUTION OF AN APPLICATION AMONG A PLURALITY OF COMPUTE NODES THROUGH APPLICATION-LEVEL VIRTUALIZATION

CROSS-REFERENCE TO RELATED APPLICATION(s)

This application claims the benefit of U.S. Provisional Application No. 63/164,955, filed on Mar. 23, 2021, which is incorporated by reference herein.

BACKGROUND

Data volume is increasing due to artificial intelligence (AI) and deep learning applications. This increase in data volume requires a commensurate increase in compute power. However, microprocessors cannot supply the needed compute power. Consequently, specialized architectures, such as accelerators and coprocessors, are taking over many of the compute tasks. These specialized architectures need to share access to large portions of system memory to achieve significant performance improvement.

Using specialized architectures creates new problems to be solved. Virtualizing specialized architectures is difficult, requiring high investment and strong vendor support because the architectures are usually proprietary.

One solution is intercepting the programming interfaces for the architecture, i.e., the application programming interfaces (APIs). In this solution, the intercepted APIs are sent to a node, on which a particular specialized architecture (such as graphics processing units (GPUs) of a particular vendor) is installed and executed on that node. The execution relies on distributed shared memory (DSM) between central processing units (CPUs) and the GPUs. When tight memory coherence is needed between the CPUs and GPUs, remote procedure calls (RPCs) are used, which requires high traffic between nodes and highly detailed knowledge of the API semantics and the GPUs.

A better solution is needed, i.e., one that can handle specialized architectures of not just one but many different vendors on the same node without requiring specialized knowledge of the specialized architecture.

SUMMARY

One embodiment provides a method for executing an application over a plurality of nodes. The method includes executing a first portion of the application by first threads of the runtime of a first node and a second portion of the application by second threads of the runtime of a second node, and under control of the application monitors of the first and second nodes and while executing the first portions and second portions of the application, migrating workloads of one or more of the first threads from the first node to the second node for execution by the second threads.

Further embodiments include a device configured to carry out one or more aspects of the above method and a computer system configured to carry out one or more aspects of the above method.

DETAILED DESCRIPTION

In the embodiments, an application is co-executed among a plurality of nodes, where each node has installed thereon a plurality of specialized architecture coprocessors, including those for artificial intelligence (AI) and machine learning (ML) workloads. Such applications have their own runtimes, and these runtimes offer a way of capturing these workloads by virtualizing the runtimes. New architectures are easier to handle because of the virtualized runtime, and coherence among nodes is improved because the code for a specialized architecture runs locally to the specialized architecture. An application monitor is established on each of the nodes on which the application is co-executed. The application monitors maintain the needed coherence among the nodes to virtualize the runtime and engages semantic-aware hooks to reduce unnecessary synchronization in the maintenance of the coherence.

Figure 1:
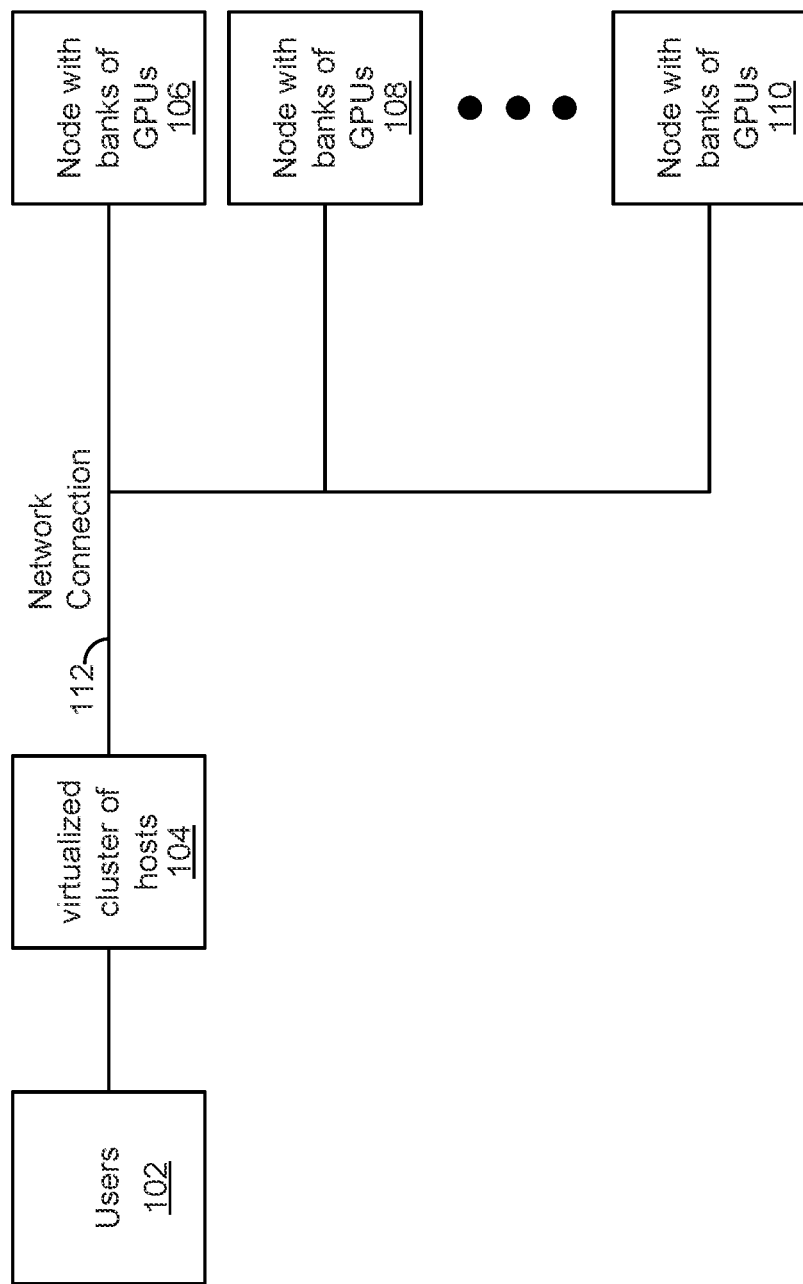
FIG. 1 depicts an arrangement for accessing banks of GPUs in the prior art.

FIG. 1 depicts an arrangement for accessing banks of GPUs in the prior art. In the arrangement depicted, users 102 interact through a virtualized cluster of hosts 104, which is connected via a network 112 to nodes 106, 108, 110, containing a bank of GPUs of a particular vendor. Each node 106, 108, and 110 is a server with a hardware platform and an operating system. Each node is configured with the GPUs of the particular vendor. Compute nodes in virtualized cluster of hosts 104 send APIs, which are specific to the GPUs, to nodes 106, 108, 110 for execution on the GPUs.

Figure 2:
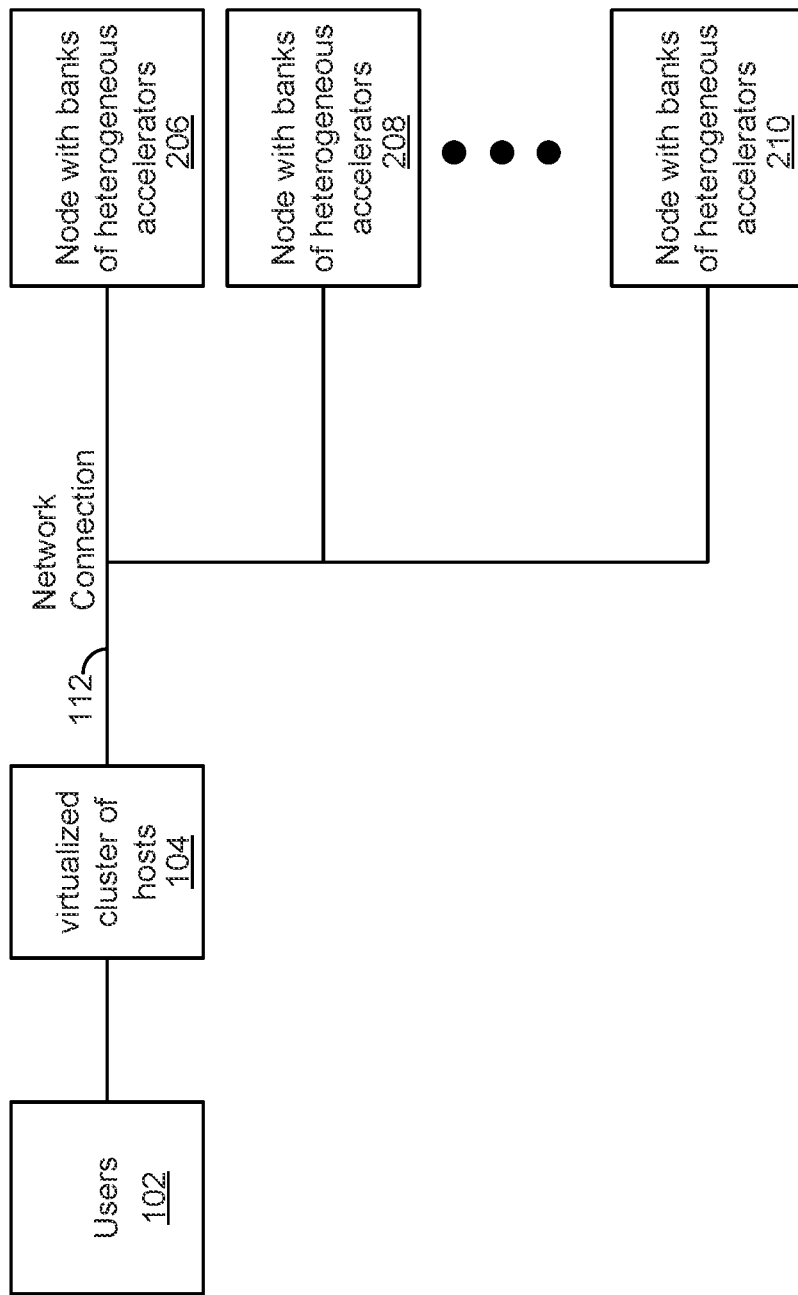
FIG. 2 depicts an arrangement for accessing banks of accelerators, according to an embodiment.

FIG. 2 depicts an arrangement for accessing banks of accelerators, according to an embodiment. In the arrangement depicted, users 102 interact through a virtualized cluster of hosts 104, which is connected via a network 112 to nodes 206, 208, 210, where each node is a server-type architecture having a hardware platform, operating system, and possibly a virtualization layer. The hardware platform includes CPUs, RAM, network interface controllers, and storage controllers. The operating system may be a Linux® operating system or Windows® operating system. A virtualization layer may be present, and the above-operating systems may operate above the virtualization layer. In addition, in the figure, each node contains banks of heterogeneous accelerators. That is, each node 206, 208, 210 can contain many different types of accelerators, including ones from different vendors. Compute nodes in virtualized cluster of hosts 104 send requests to nodes 206, 208, 210 to run portions of applications installed in the computer nodes, on a runtime installed on nodes 206, 208, 210.

In an alternative embodiment, nodes 206, 208, 210 are nodes with large amounts of memory, and portions of a large database or other application are installed on the nodes 206, 208, 210 to run thereon, taking advantage of the node with the large amounts of memory. Portions of the application are targeted for execution on nodes having large amounts of memory instead of specific accelerators.

Languages often used for programming the specialized architectures or accelerators include Python®. In the Python language, the source code is parsed and compiled to byte code, which is encapsulated in Python code objects. The code objects are then executed by a Python virtual machine that interprets the code objects. The Python virtual machine is a stack-oriented machine whose instructions are executed by a number of co-operating threads. The Python language is often supplemented with platforms or interfaces that provide a set of tools, libraries, and resources for easing the programming task. One such platform is TensorFlow®, in which the basic unit of computation is a computation graph. The computation graph includes nodes and edges, where each node represents an operation, and each edge describes a tensor that gets transferred between the nodes. The computation graph in TensorFlow is a static graph that can be optimized. Another such platform is PyTorch®, which is an open-source machine-learning library. PyTorch also employs computational graphs, but the graphs are dynamic instead of static. Because computation graphs provide a standardized representation of computation, they can become modules deployable for computation over a plurality of nodes.

In the embodiments, an application is co-executed among a plurality of nodes. To enable such co-execution, runtime and application monitors are established in each of the nodes. The runtimes are virtual machines that run a compiled version of the code of the application, and the application monitors co-ordinate the activity of the runtimes on each of the nodes.

Figure 3:
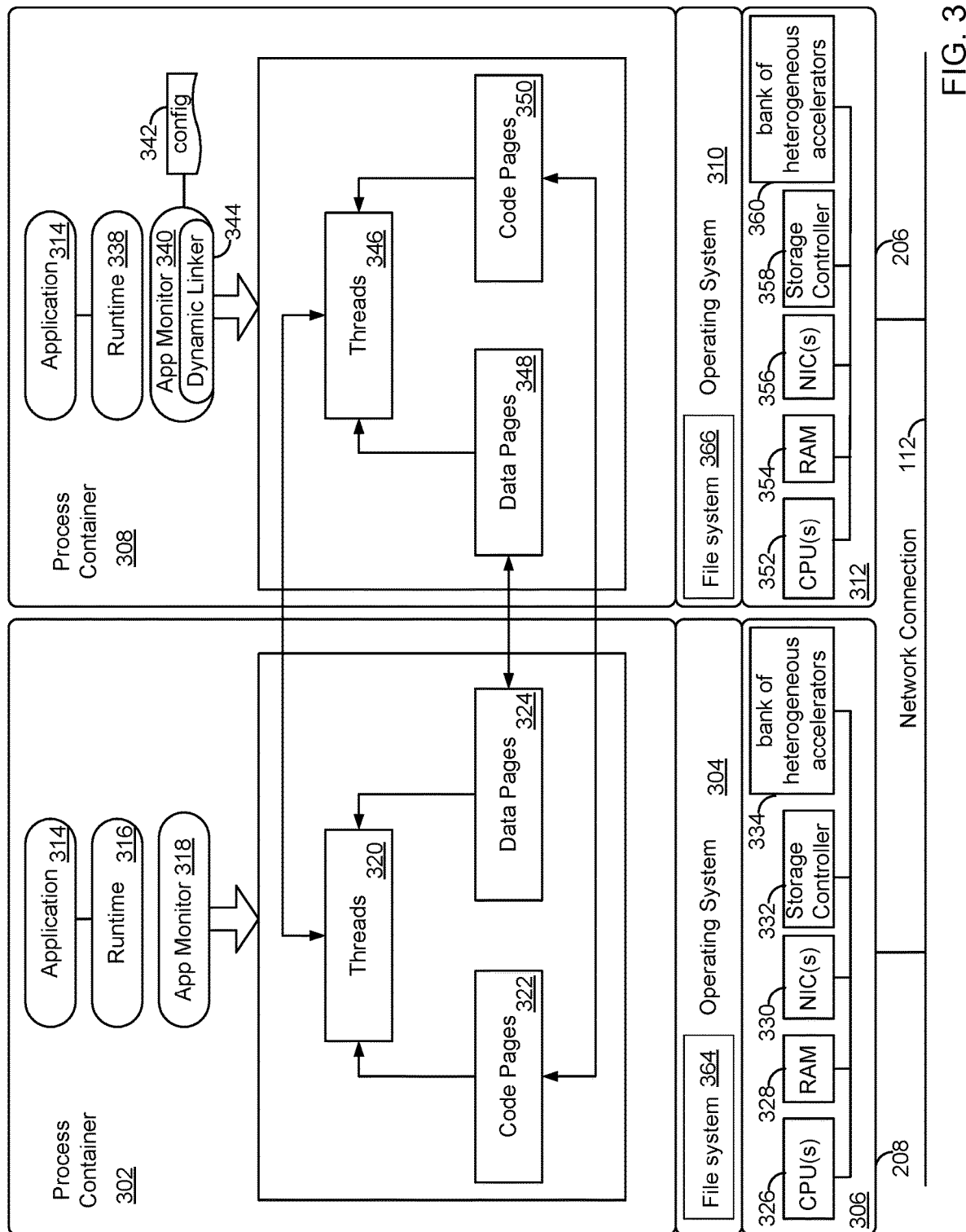
FIG. 3 depicts a representative system in which embodiments may operate.

FIG. 3 depicts a representative system in which embodiments may operate. The system includes two nodes, an initiator node 206 that starts up the system and thereafter operates as a peer node and one or more acceptor nodes 208 (only one of which is depicted). Initiator node 206 and acceptor node 208 each include a process container 302, 308 containing an application 314, a runtime 316, 338, an application monitor 318, 340, one or more threads of execution 320, 346, data pages 324, 348, and code pages 322, 350 for the threads. Process container 302, 308 runs in userspace. In one embodiment, process containers 302, 308 are Docker® containers, runtimes 316, 338 are Python virtual machines, application 314 is a Python program, with libraries such as TensorFlow or PyTorch, and threads 320, 346 correspond to the threads of the Python virtual machine. Application monitor 340 on initiator node 206 includes a dynamic linker (DL) 344 and a configuration file 342 for configuring the participating nodes. In general, a dynamic linker is a part of an OS that loads and links libraries and other modules as needed by an executable code while the code is being executed. Alternatively, the initiator node sets up an acceptor node to have an application monitor with a DL and configuration file, and the application program is loaded onto the acceptor node.

Each node 206, 208 further includes an operating system 304, 310, and a hardware platform 306, 312. Operating system 304, 310, such as the Linux® operating system or Windows® operating system, provides the services to run process containers 302, 308. In some embodiments, operating system 304, 310 runs on hardware platform 306, 312. In other embodiments, operating system 304, 310 is a guest operating system running on a virtual hardware platform of a virtual machine that is provisioned by a hypervisor from hardware platform 306, 312. In addition, operating system 304, 310 provides a file system 364, 366, which contains files and associated file descriptors, each of which is an integer identifying a file.

Hardware platform 306, 312 on the nodes respectively includes one or more CPUs 326, 352, system memory, e.g., random access memory (RAM) 328, 354, one or more network interface controllers (NICs) 330, 356, a storage controller 332, 358, and a bank of heterogeneous accelerators 334, 360. The nodes are interconnected by network 112, such as Ethernet®, InfiniB and, or Fibre Channel.

Before running an application over a plurality of nodes, the nodes are set up. Setup of the initiator node 206 and acceptor node 208 includes establishing the application monitor and runtimes on each of the nodes on which libraries or other deployable modules are to run, the coherent memory spaces in which the application, libraries or other deployable modules are located, and the initial thread of execution of each runtime. With the setup complete, the application monitors and runtimes in each node co-operate to execute the application among the plurality of nodes.

Figure 4A:
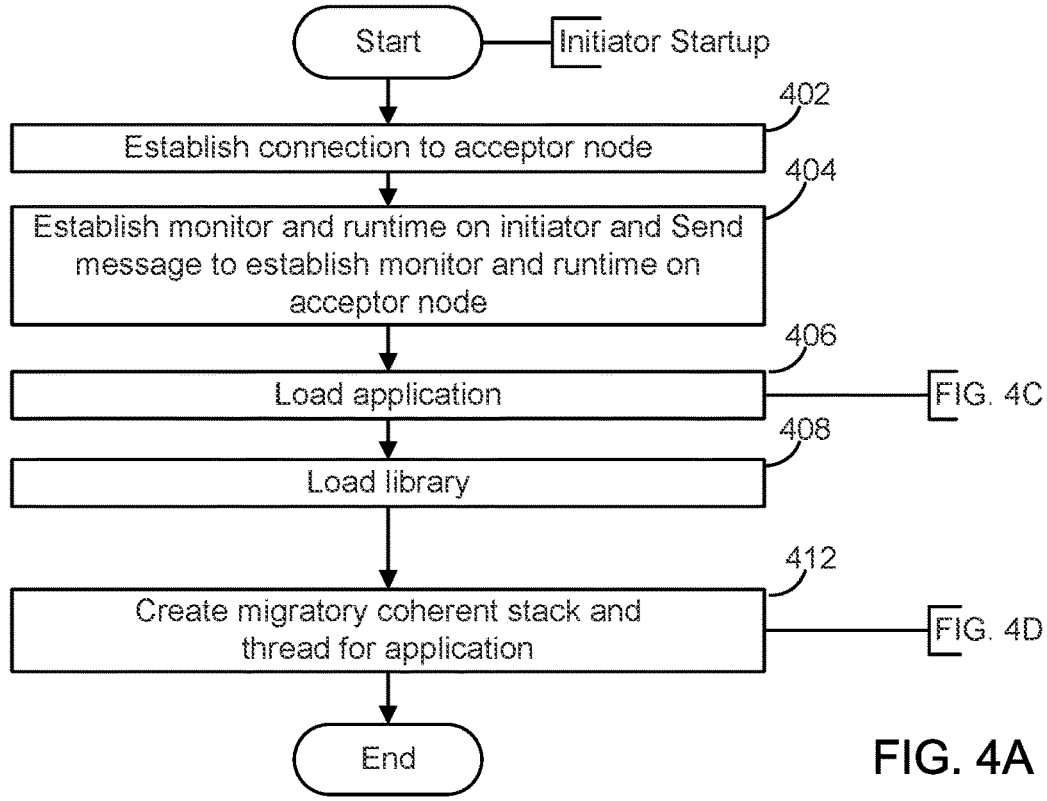
FIG. 4A depicts a flow of operations for an initiator node setup, according to an embodiment.
Figure 4B:
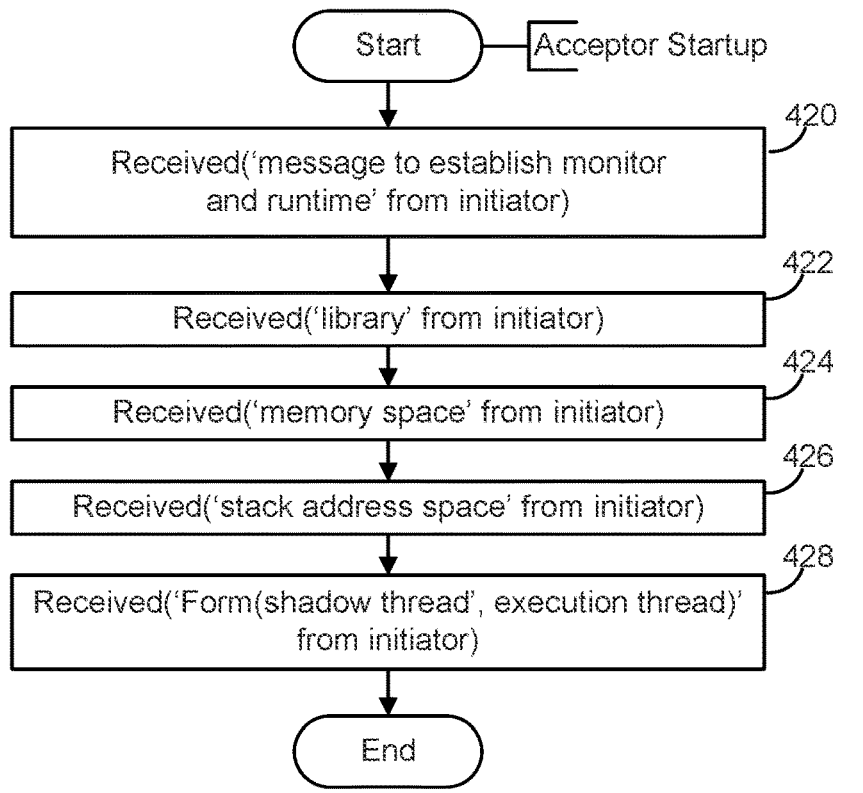
FIG. 4B depicts a flow of operations for an acceptor node setup, according to an embodiment.
Figure 4C:
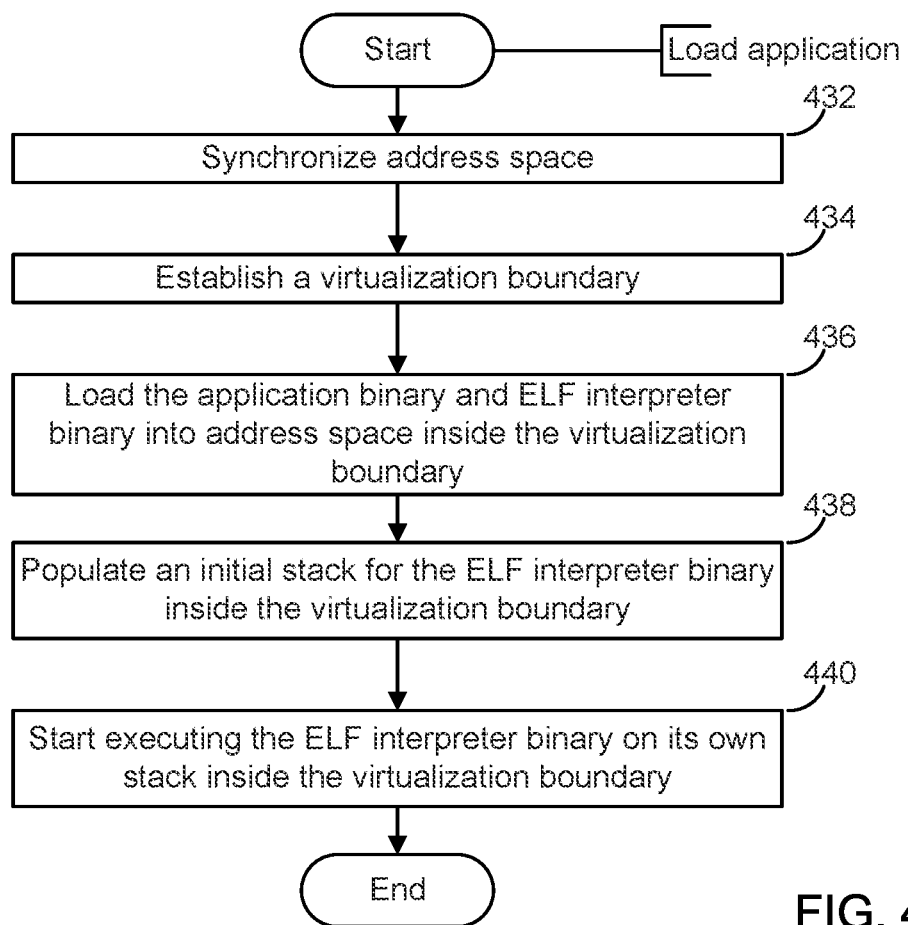
FIG. 4C depicts a flow of operations for loading an application, according to an embodiment.
Figure 4D:
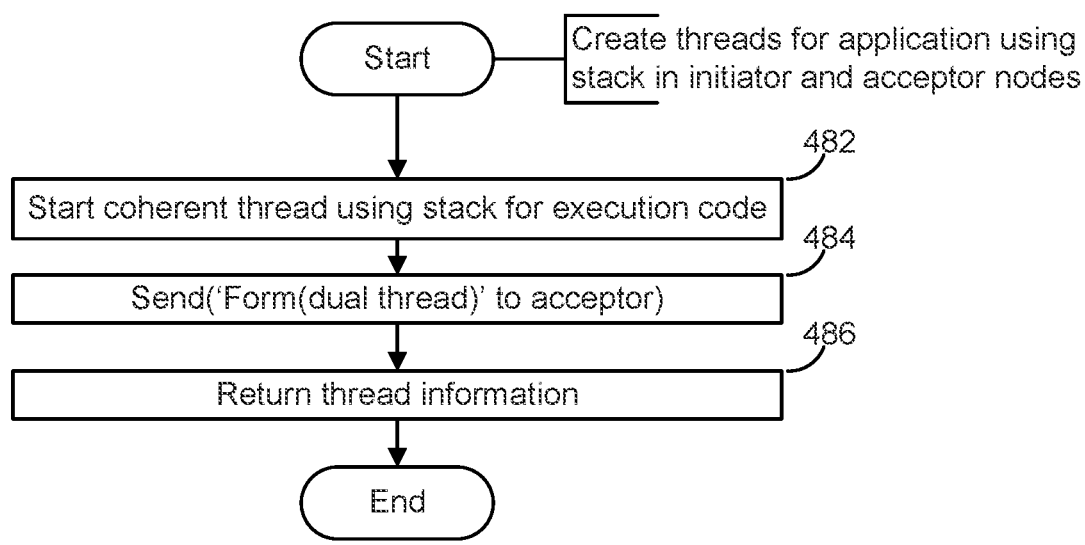
FIG. 4D depicts a flow of operations for creating threads for an application, according to an embodiment.

FIGS. 4A-4D depict a flow of operations for an initiator node 206 setup and an acceptor node 208 setup, according to an embodiment. Specifically, FIG. 4A depicts a flow of operations for an initiator node setup, according to an embodiment. FIG. 4B depicts a flow of operations for an acceptor node setup, according to an embodiment. FIG. 4C depicts a flow of operations for loading an application, according to an embodiment. FIG. 4D depicts a flow of operations for creating threads for an application, according to an embodiment.

Referring to FIG. 4A, on start-up, initiator node 206 establishes a connection to acceptor node 208 in step 402. In step 404, initiator node 206 establishes an application monitor and a runtime on initiator node 206 and sends a message requesting that acceptor node 208 establish an application monitor and runtime thereon. Initiator node 206 then performs a coherent load of an application binary (step 406, further described with reference to FIG. 4C). In step 408, initiator node 206 may load a library if needed. In step 412, further described with reference to FIG. 4D, a thread is started using this stack, with an entry point being the application's 'main' function.

Referring to FIG. 4B, on start-up, acceptor node 208 receives a message to establish application monitor 318 and runtime 316 in step 420. In step 422, acceptor node 208 receives the library or other deployable module from initiator node 206, and in response, loads the received code for the library or other deployable module. In step 424, acceptor node 208 receives the request to create memory space from initiator node 206 and, in response, creates the memory space at the specified location. In step 426, acceptor node 208 receives a request to create the stack address space from initiator node 206 and, in response, creates and locates the requested stack address space. Acceptor node 208 then receives, in step 428, a command from initiator node 206 to form a dual (shadow) thread based on the execution thread in initiator node 206 and, in response, establishes the requested dual thread.

Referring to FIG. 4C, in step 432, initiator node 206 synchronizes address spaces. In step 434, initiator node 206 establishes a virtualization boundary. Establishing the boundary includes creating a sub-process (called VProcess below) that shares an address space with its parent process and can have its system calls traced by the parent. The parent process detects the sub-process interactions with the operating system and ensures that these interactions are made coherently with the other node or nodes. In step 436, initiator node 206 loads the application binary and an ELF (Executable and Linkable Format) interpreter binary into the address space inside the virtualization boundary. The parent process detects this address space manipulation through tracing and keeps the acceptor node coherent with changes made by the sub-process. In step 438, initiator node 206 populates an initial stack for the ELF interpreter binary inside the virtualization boundary, and in step 440, initiator node 206 starts executing the ELF interpreter binary on its own stack inside the virtualization boundary. Execution inside the virtualization boundary assures that address spaces and execution policies are coherent between the initiator and acceptor nodes and that any changes made by the runtime are intercepted so that consistency of the loaded application is maintained.

Executing the ELF interpreter binary inside the virtualization boundary may entail loading a library on the initiator or acceptor node and possibly establishing a migration policy regarding the library (e.g., pinning the library to a node, e.g., the acceptor node). Additionally, the ELF interpreter binary may establish additional coherent memory spaces, including stack spaces needed by the application.

In an alternative embodiment, instead of loading the application binary on initiator 206 in step 434, initiator 206 sends to acceptor 208 a command which contains instructions about how to load the application binary, and acceptor 208 processes these instructions to load the application binary on itself.

Referring to FIG. 4D, coherent execution threads are established by starting an execution thread using the just created stack in step 408. In step 484, a command to form a dual execution thread corresponding to an execution thread on the local node is sent to acceptor node 208. In step 486, the thread information is returned. The dual thread is paused or parked, awaiting a control transfer request from the local node. When execution moves from one node to another, the register state of the local thread is recorded and sent to the other node as the local thread is parked. The other node receives the register state and uses it to resume the parked dual thread. In this way, the previously active thread becomes the inactive thread, and the inactive thread becomes the currently active thread. The movement of the active thread is further described with respect to FIGS. 6A and 6B.

An MSI-coherence protocol applied to pages maintains coherence between memory spaces on the nodes so that the threads of the runtime are operable on any of the nodes. A modified (state 'M') memory page in one node is considered invalid (state 'I') in another. A shared (state 'S') memory page is considered read-only in both nodes. A code or data access to a memory page that is pinned to acceptor node 208 causes execution migration of the thread to acceptor node 208 followed by migration of the page; a data access to a memory page that is migratory triggers a migration of that memory page in a similar manner. In an alternate embodiment, upon a fault caused by an instruction accessing a code or data page on acceptor node 208, only the instruction is executed on the node having the code or data page, and the results of the instruction are transferred over the network to the acceptor node.

Figure 5A:
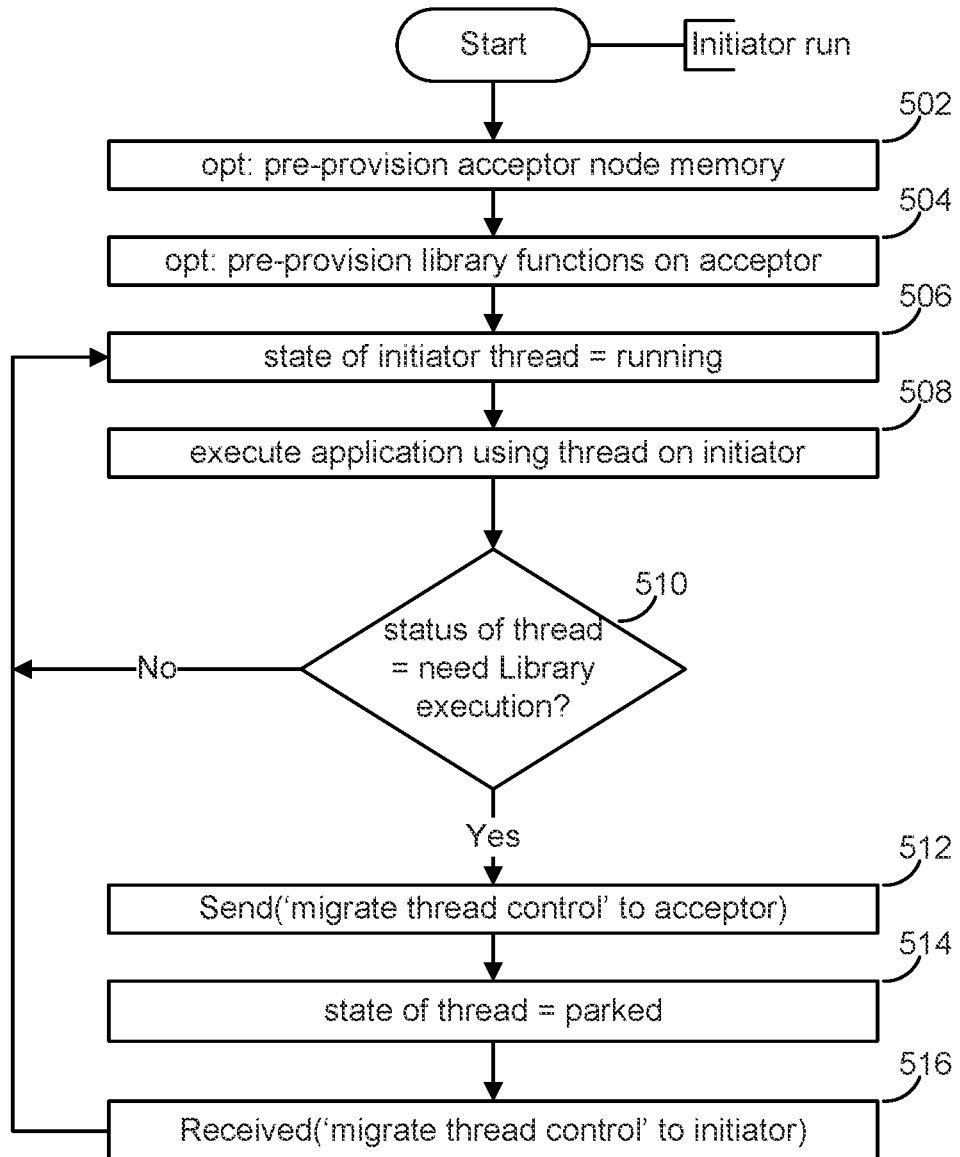
FIG. 5A depicts a flow of operations for running the initiator node, according to an embodiment.
Figure 5B:
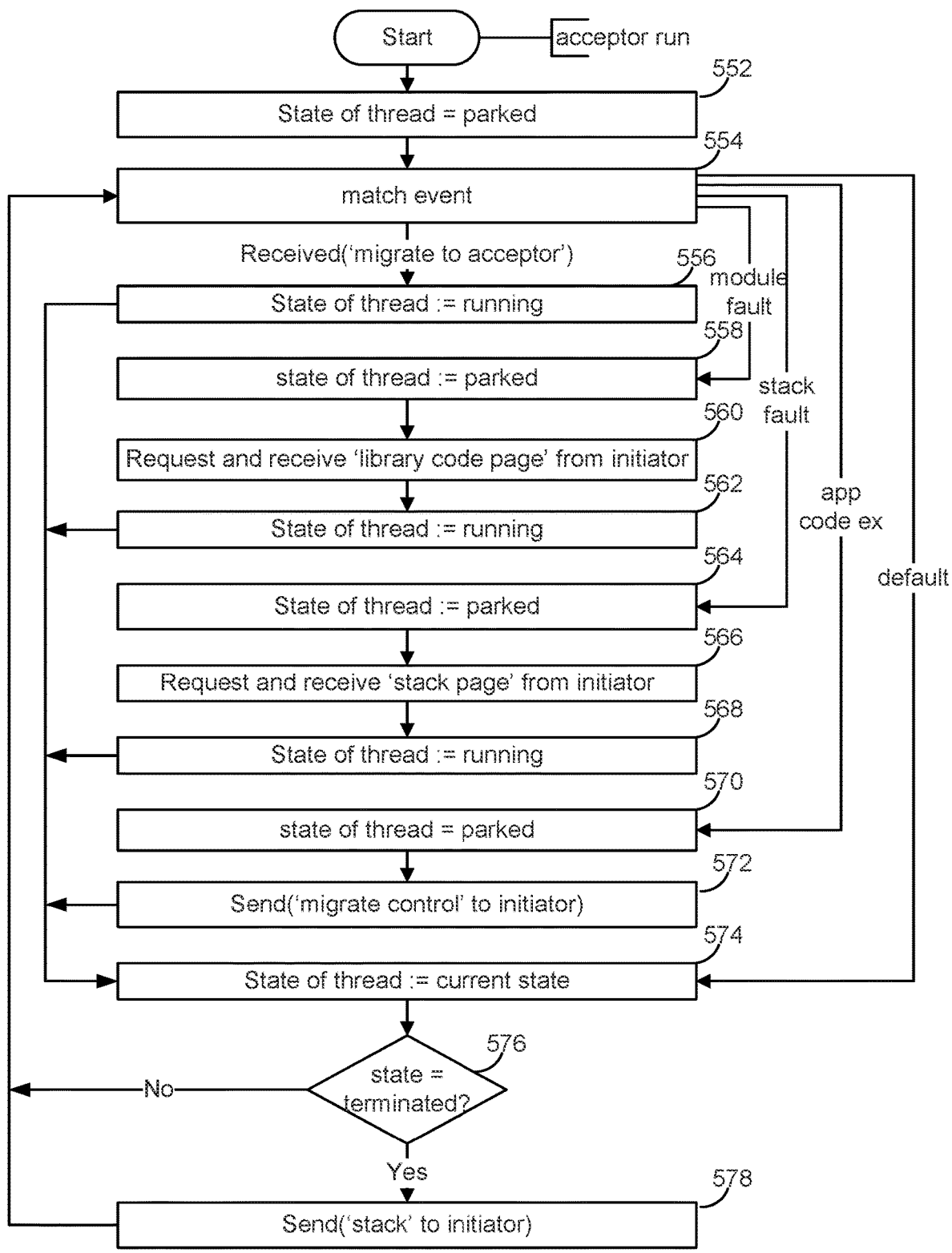
FIG. 5B depicts a flow of operations for running an acceptor node, according to an embodiment.

FIGS. 5A-5B describes interactions of running the application on the initiator and acceptor nodes after the setup according to FIGS. 4A-4D is completed. These interactions include, in the course of executing the application on the initiator node, executing a library or other deployable module on the acceptor node. Executing the library or other deployable module involves 'faulting in' the code pagers for the library or other deployable module, the data pages of the stack or other memory space, and moving execution back to the initiator node.

FIG. 5A depicts a flow of operations for running the initiator node, according to an embodiment. In step 502, acceptor node 208 is optionally pre-provisioned with stack or memory pages anticipated for executing threads on acceptor node 208 as described below. In step 504, acceptor node 208 is optionally pre-provisioned with functions of the library or other deployable module anticipated for the code. In step 506, the state of the thread is set to running. In step 508, the initiator code executes application 314 using the now running thread on initiator node 206. In step 510, the thread determines whether the execution of a function of a library or other deployable module is needed. If not, then the thread continues execution of its workload. If execution of a library or module function is needed, then in step 512, a message is sent to acceptor node 208 to migrate the workload of the thread to acceptor node 208. In step 514, the state of the local thread is set to a parked state, which means that the thread is paused but runnable on behalf of a dual thread on acceptor node 208. In step 516, initiator node 206 awaits and receives a message to migrate the workload of the thread back to initiator node 206 after acceptor node 208 has finished executing the function of the library or other deployable module.

Pre-provisioning of the memory pages or stack pages is performed by a DWARF-type (debugging with attributed record formats) debugger data. When initiator node 206 takes a fault on entry to the acceptor-pinned function, it analyzes the DWARF data for the target function, determines that it takes a pointer argument, sends the memory starting at the pointer to acceptor node 208, and sends the current page of the stack to acceptor node 208. The DWARF debugger data contains the address and sizes of all functions that can be reached from this point in the call graph, allowing the code pages to be sent to acceptor node 208 prior to being brought in by demand-paging. In this way, acceptor node 208 can pre-provision the memory it needs to perform its function prior to resuming execution.

FIG. 5B depicts a flow of operations for running an acceptor node, according to an embodiment. In step 552, the state of the local thread is initially set to parked. In step 554, one of five events occurs on acceptor node 208. The events are 'migrate to acceptor', 'module fault', 'stack fault', 'application code execution', or 'default'. The module fault and stack fault, though specifically described, are examples of a memory fault which may include other types of memory faults, such as a heap fault and code fault, not described. The different types of memory faults are handled in a similar manner.

If the event is 'migrate to acceptor', then the state of the local thread is set to running in step 556. Flow continues to step 574, which maintains the thread's current state, and to step 576, where acceptor node 208 determines whether the thread is terminated. If not, control continues to step 554 to await the next event, such as a 'library fault', a 'stack fault', 'execution of the application'.

If the event is a 'module fault', e.g., a library fault, then the state of the thread is set to parked in step 558, and in step 560, acceptor node 208 requests and receives a code page of the library or other deployable module not yet paged in from initiator node 206. In step 562, acceptor node 208 sets the state of the local thread to running, and the flow continues with the local thread running through steps 574, 576, 554 to await the next event if the thread is not terminated.

If the event is a 'stack fault', then the thread's state is set to parked in step 564, and the initiator node 206 sends a request to receive a stack page not yet paged in from initiator 206. In step 568, the thread's state is set to running, and the flow continues through steps 574, 576, and 554 to await the next event assuming no thread termination.

If the event is 'application code execution', then the state of the local thread is set to parked in step 570, and acceptor node 208 sends a 'migrate control' message to initiator node 206 in step 572. Flow continues through steps 574, 576, and 554 to await the next event.

If the event is 'default' (i.e., any other event), then the thread's state is maintained in step 574, and flow continues through steps 576 and 554 to await the next event.

If the thread terminates as determined in step 576, the stack is sent back to initiator node 206 in step 578, and flow continues at step 554, awaiting the next event. If no event occurs, then 'default' occurs, which loops via steps 574 and 554 to maintain the thread's current state.

Figure 6A:
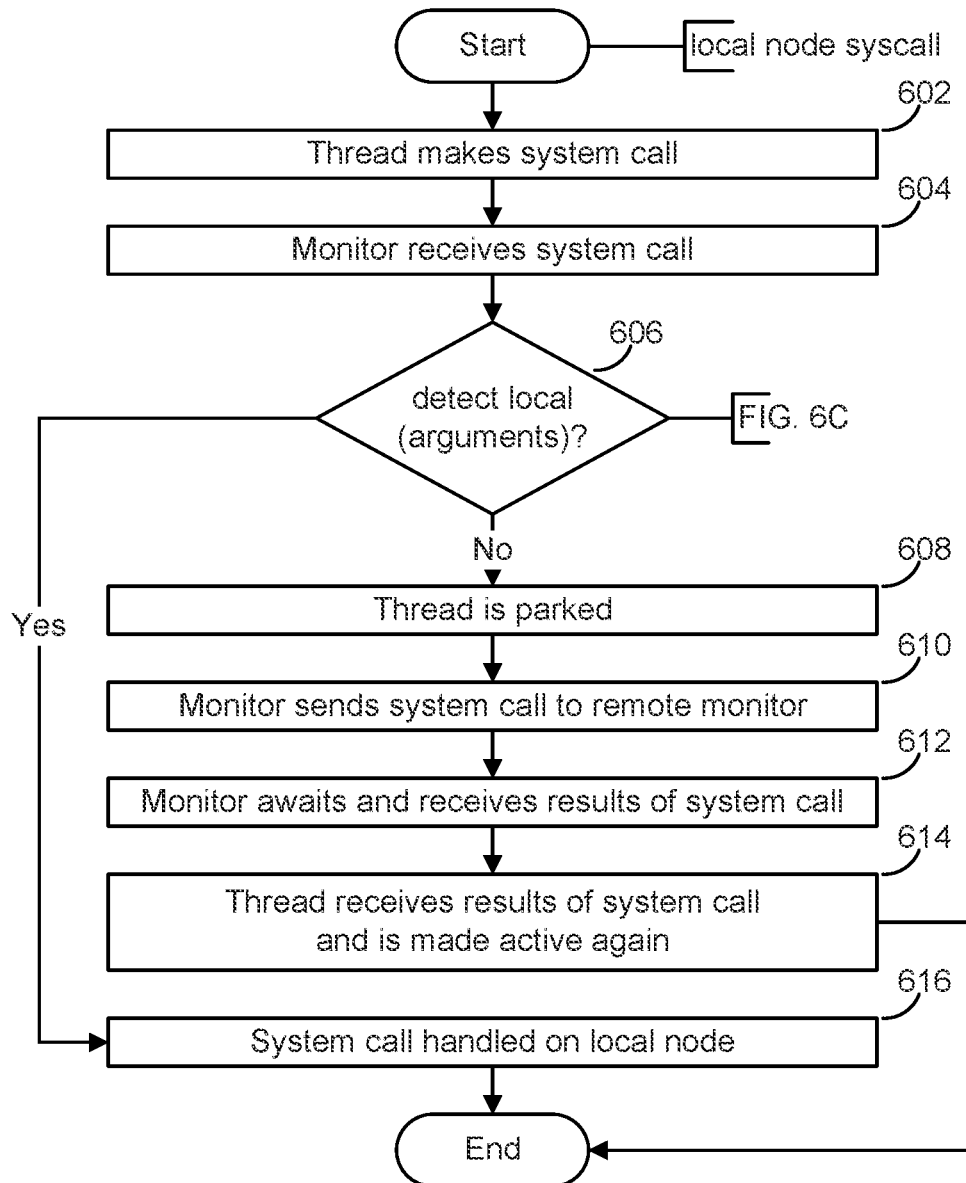
FIG. 6A depicts a flow of operations for implementing a system call on the initiator node, according to an embodiment.
Figure 6B:
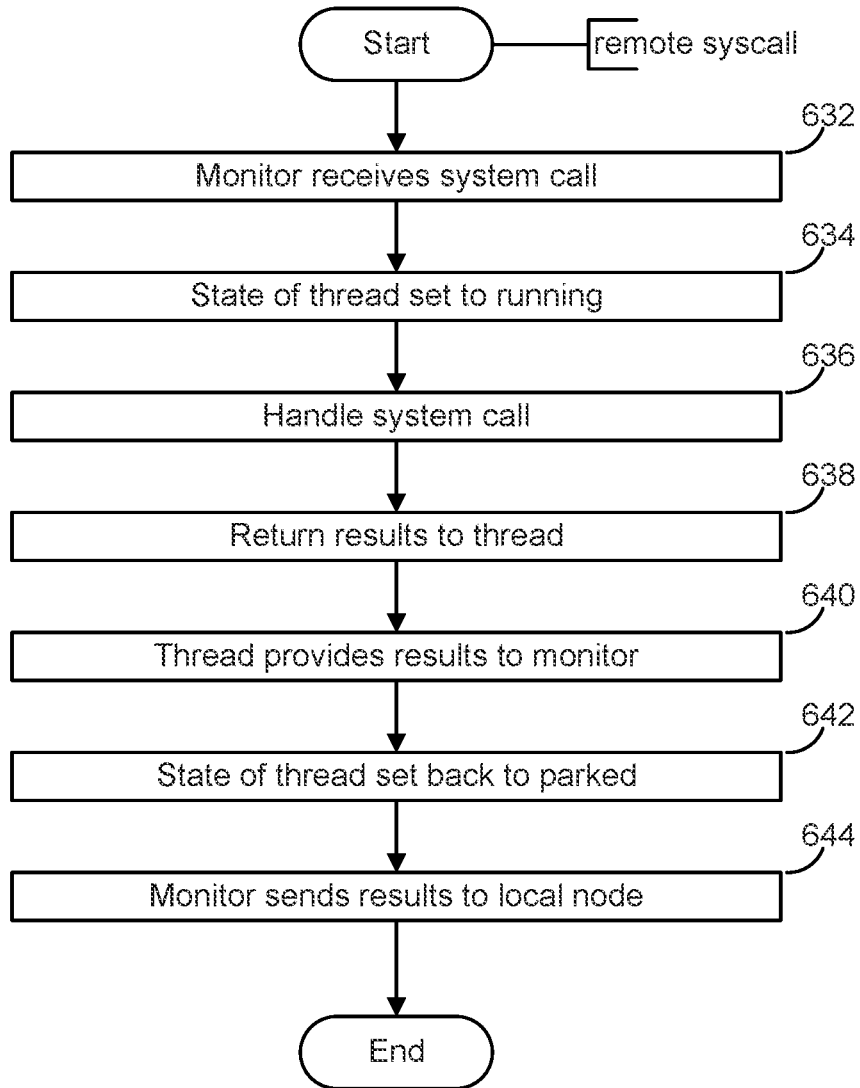
FIG. 6B depicts a flow of operations for implementing a system call on the acceptor node, according to an embodiment.
Figure 6C:
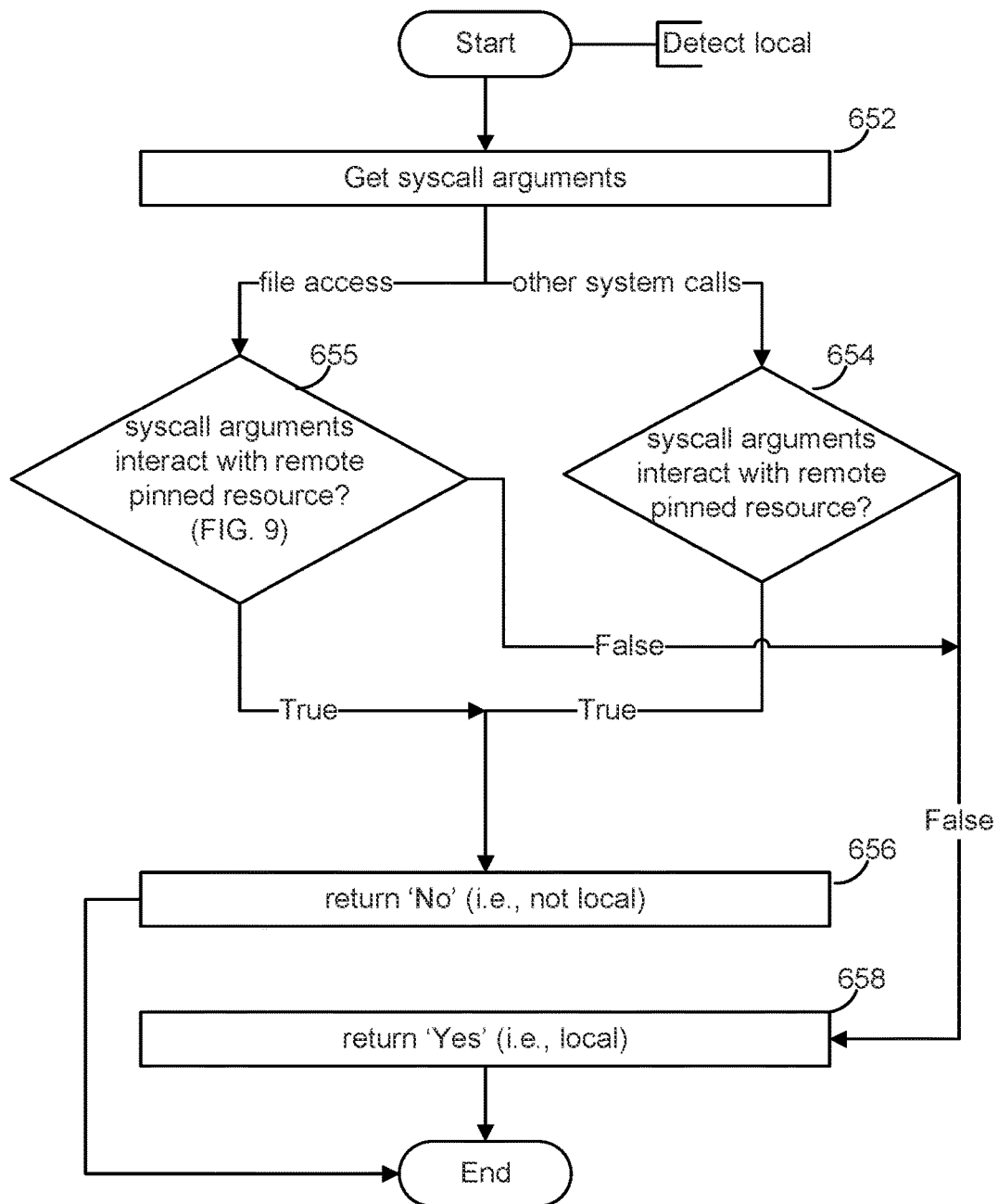
FIG. 6C depicts a flow of operations for implementing a Detect Local function, according to an embodiment.

Often in the course of execution of the application, operating system services are needed. The application, via the runtime on a particular node, makes system calls to the operating system to obtain these services. However, the particular node making the system call may not have the resources for executing the system call. In these cases, the execution of the system call is moved to a node having the resources. FIGS. 6A-6C depict the flow of operations to execute and possible move execution of a system call. Specifically, FIG. 6A depicts a flow of operations for implementing a system call on the initiator node, according to an embodiment. FIG. 6B depicts a flow of operations for implementing a system call on the acceptor node, according to an embodiment. FIG. 6C depicts a flow of operations for implementing a Detect Local function, according to an embodiment.

Referring to FIG. 6A, in step 602, a thread running in the local node makes a system call. In step 604, the application monitor on the local node receives the system call via a program that is responsible for manipulating interactions with the virtualization boundary (called VpExit below). In step 606, the application monitor determines whether the arguments involve local or remote resources. In step 608, if the system call involves remote resources ('No' branch), then the running thread is parked, and in step 610, the application monitor sends the system call and its arguments to the application monitor on the remote node that is to handle the system call. In step 612, the application monitor on the local node awaits completion and results of the system call, and in step 614, the running thread receives the results of the system call (via VpExit) and is made active again. In step 608, if the system call involves only local resources ('Yes') branch, then the local node handles the system call in step 616.

Referring now to FIG. 6B, in step 632, the application monitor on the remote node receives the system call and its arguments. In step 634, the state of the parked thread is set to active (i.e., running) and the remote node handles the system call in step 636. In step 638, the results of the system call are returned to the thread that made the call, which provides in step 640 the results to the application monitor, after which in step 642, the state of the thread is set back to the parked state. In step 644, the application monitor sends the completion and results back to the local node.

Referring now to FIG. 6C, the flow of operations depicted in the figure occurs in response to executing step 606. In step 652, the function gets all of the system call arguments and in step 654 determines for system calls, other than a file access, whether the arguments interact with a resource pinned on another node, which is either a different acceptor node or the initiator node. If so, then the function returns 'True' in step 656. Otherwise, the function returns 'False' in step 658. If the system call is a file access, then the flow executes step 655, which is further described with reference to FIG. 9.

Figure 7:
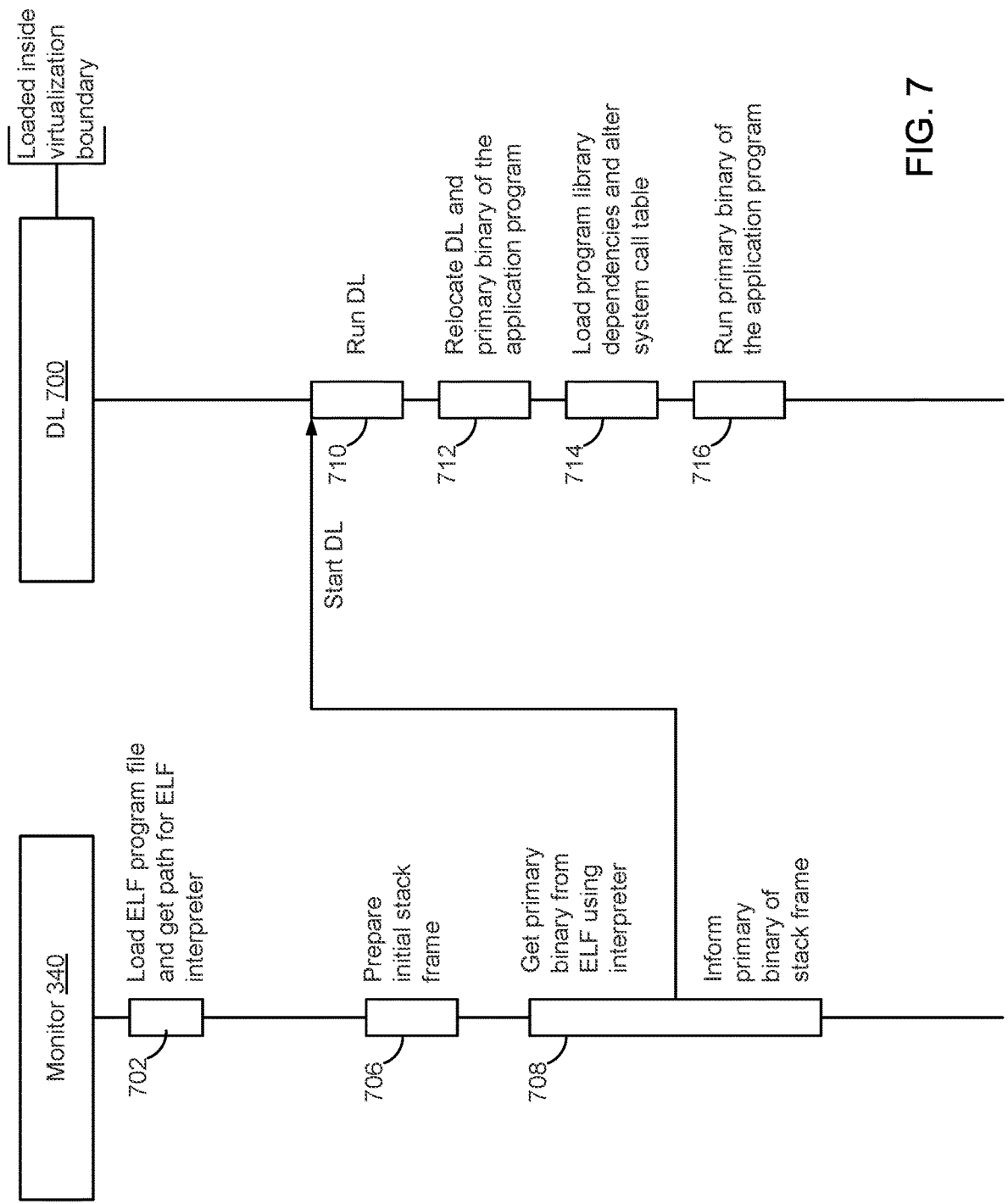
FIG. 7 depicts a flow of operations for loading a program file and a dynamic linker, according to an embodiment.

FIG. 7 depicts a flow of operations for loading a program file and a dynamic linker, according to an embodiment. The flow of operations of FIG. 7 describes in more detail the step of loading the application according to step 432 of FIG. 4C, where the loading is performed by the operating system, the application monitor, and the dynamic linker.

In step 702, application monitor 340 loads the ELF program file and gets a file system path for the ELF interpreter binary. In step 706, application monitor 340 prepares an initial stack frame for a binary of application program 314 (hereinafter referred to as "primary binary"). In step 708, application monitor 340 acquires the primary binary using the ELF interpreter and informs the binary of the initial stack frame. In step 708, application monitor 340 starts DL 344, which was loaded by operating system 310. In step 710, DL 344 runs, and in step 712, DL 344 relocates the primary binary and DL 344 to executable locations, which are locations in system memory from which code execution is allowed by the OS. In step 714, DL 344 loads the program dependencies (of the library or other deployable module) and alters the system call table to intercept all system calls made by the primary binary. Some system calls are allowed through unchanged, while others are altered when DL 344 interacts with operating system 310. In step 716, DL 344 causes the relocated primary binary of application program 314 to run at the executable location. As a result, both application program 314 and DL 344 run in userspace. Running in user space allows loading of the library or other deployable to be within the virtualization boundary.

DL 344 can replace certain function calls that go through the library or other deployable modules with customized versions to add functional augmentation based on known semantics. In allocating address space using 'mmap' or 'sbreak', DL 344 assures, via the application monitor, that threads see a consistent view of the address space, so execution of threads may migrate over the nodes. In addition, a 'ptrace' system call is used to track the execution of DL 344 to find how it interacts with operating system 310. Interactions are then rewritten so that they run coherently between initiator node 206 and acceptor node 208. Ultimately, all interactions with operating system 310 go through symbols defined by DL 344 or resolved through DL 344.

Figure 8A:
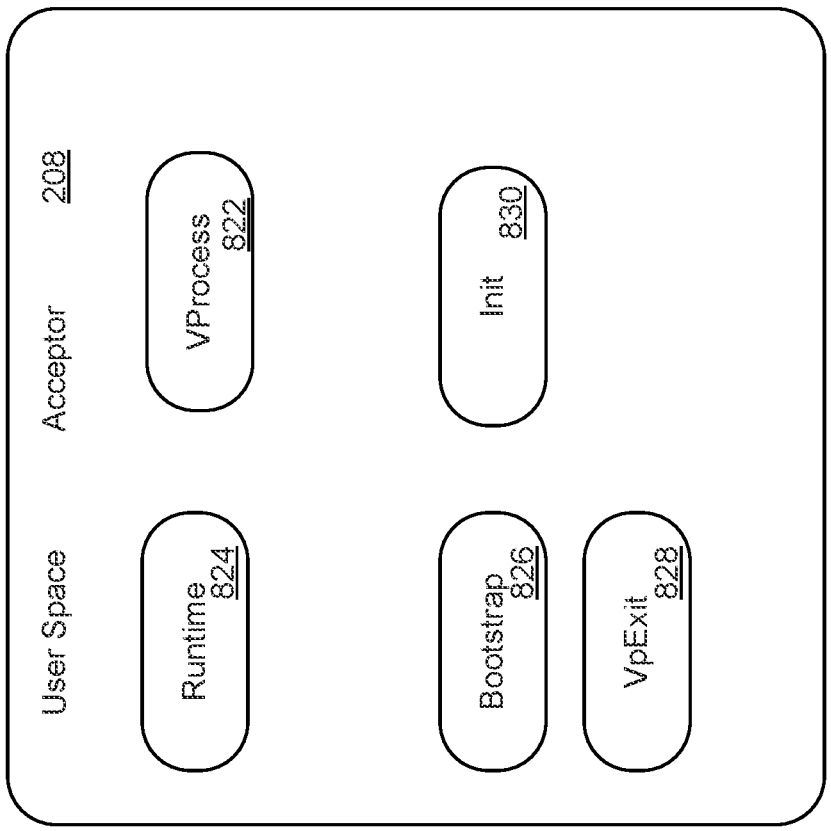
FIG. 8A depicts components in an initiator node and an acceptor node involved in setting up the initiator and acceptor nodes, according to an embodiment.
Figure 8A:
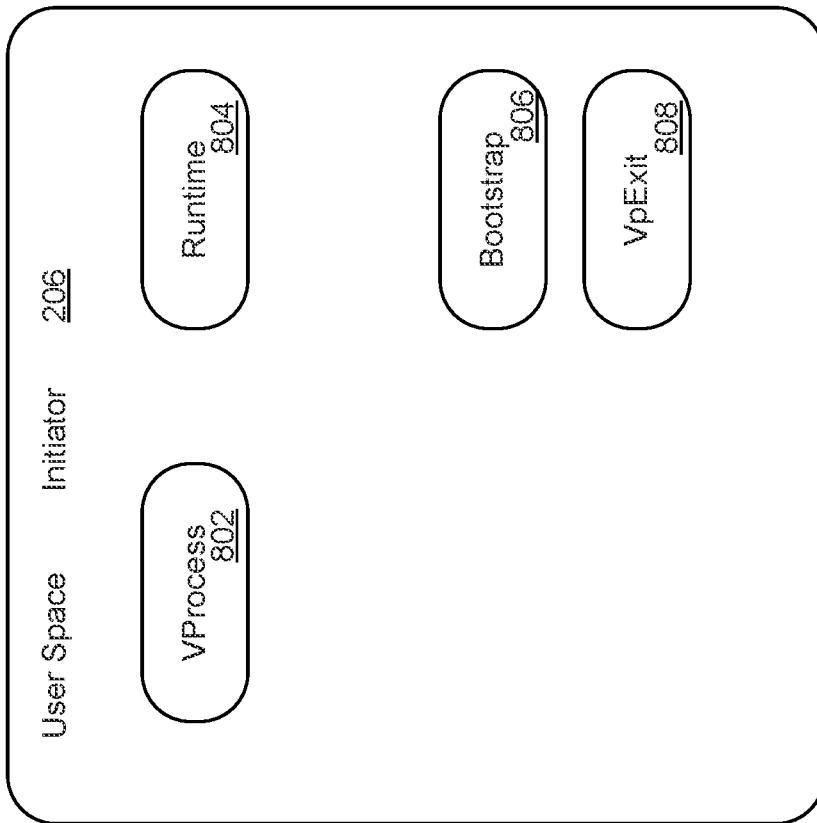
Figure 8B:
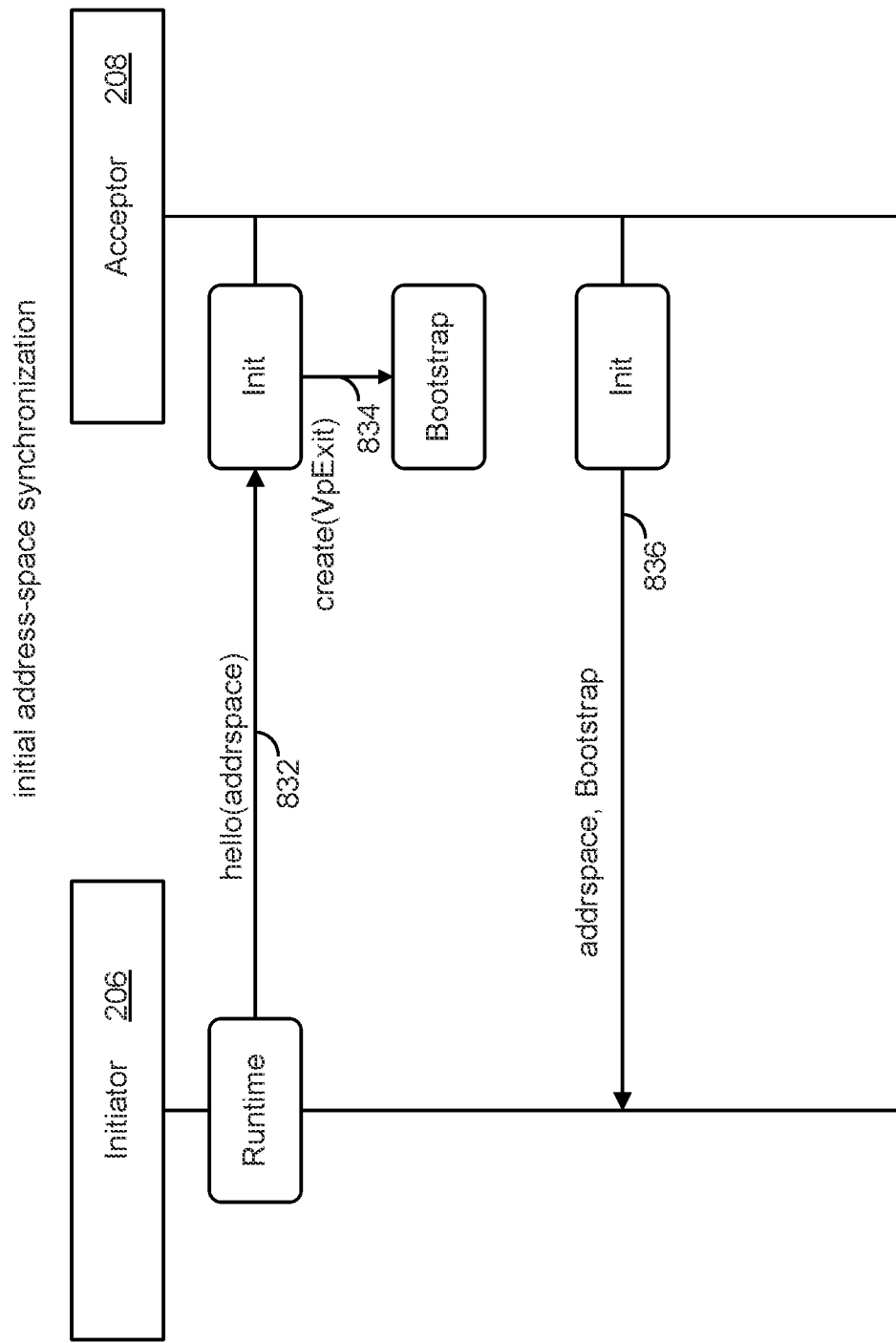
FIG. 8B depicts a flow of operations between initiator and acceptor nodes during address space synchronization, according to an embodiment.
Figure 8C:
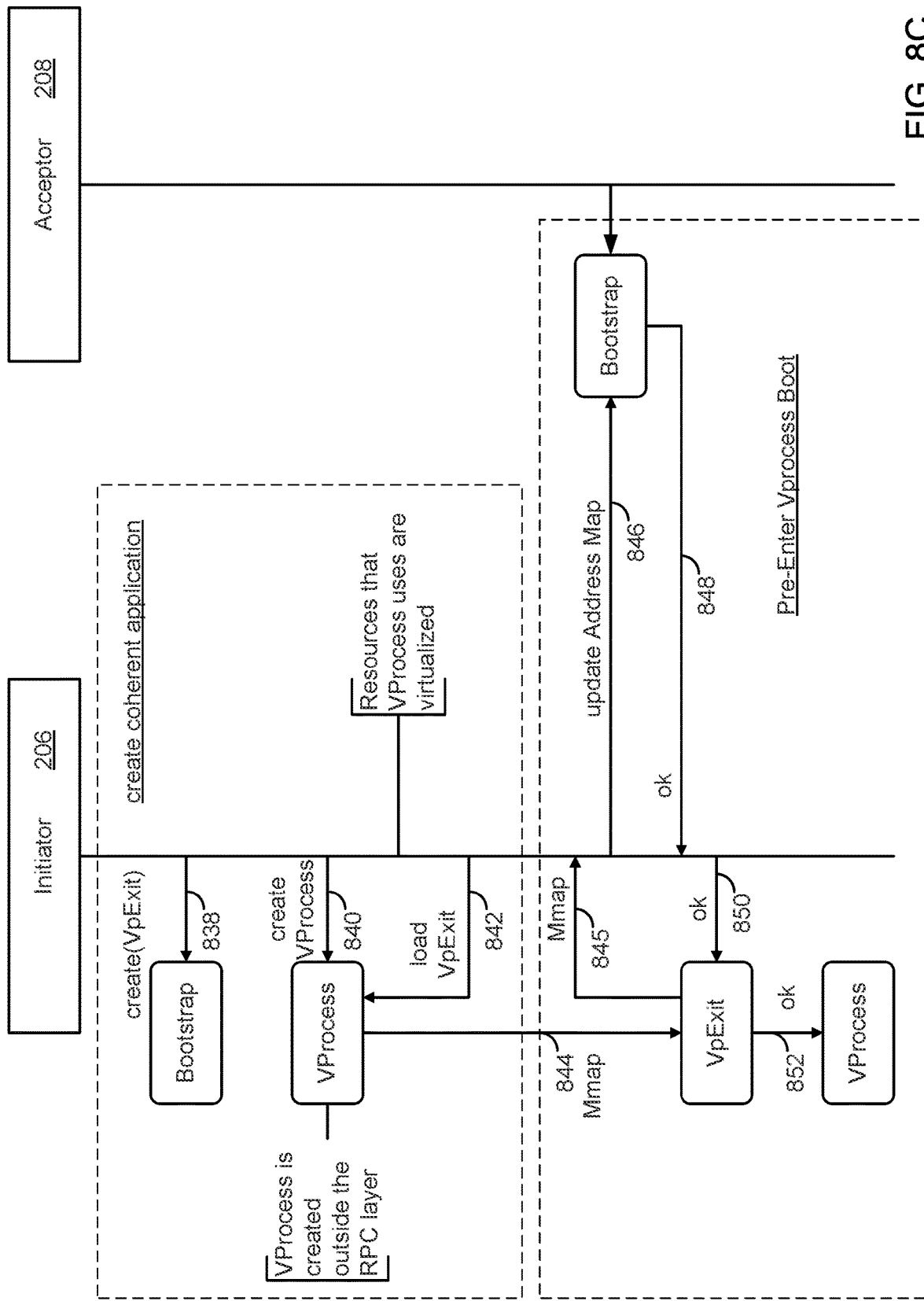
FIG. 8C depicts a flow of operation between an initiator and acceptor nodes during the creation of a coherent application, according to an embodiment.
Figure 8D:
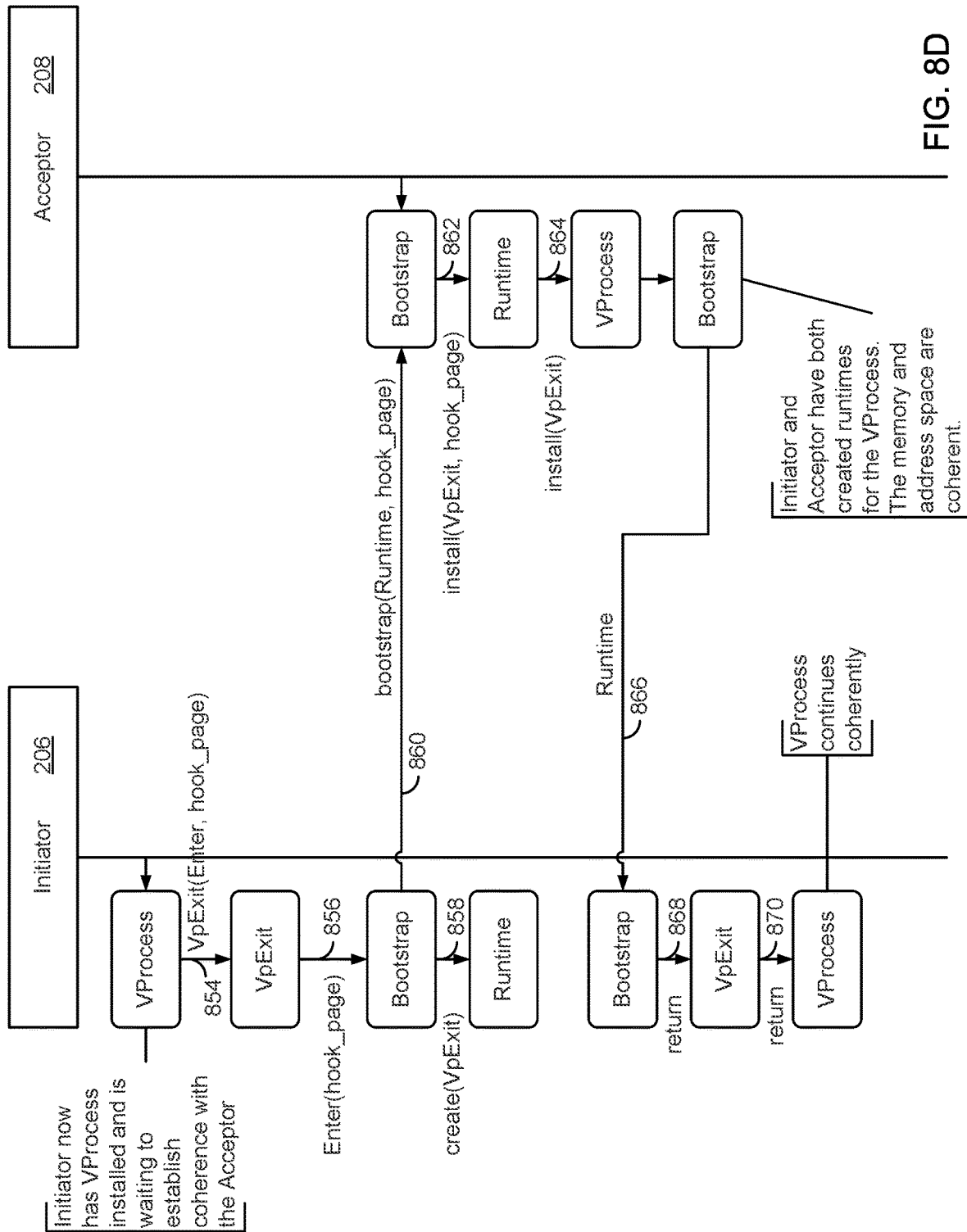
FIG. 8D depicts a flow of operations between an initiator and acceptor nodes during the establishment of runtimes, according to an embodiment.

FIGS. 8A-8D describe the components and operations in more detail during the setup of the initiator node and acceptor node corresponding to steps 404, 442, 446, 450, 464, 466 of FIGS. 4A-4D. Specifically, FIG. 8A depicts components in an initiator node and an acceptor node involved in setting up the initiator and acceptor nodes, according to an embodiment. FIG. 8B depicts a flow of operations between initiator and acceptor nodes during address space synchronization, according to an embodiment. FIG. 8C depicts a flow of operation between an initiator and acceptor nodes during the creation of a coherent application, according to an embodiment. FIG. 8D depicts a flow of operations between an initiator and acceptor nodes during the establishment of runtimes, according to an embodiment.

Referring to FIG. 8A, initiator node 206 includes a VProcess 802, a Runtime module 804, a Bootstrap module 806, and a VpExit module 808. Acceptor node 208 includes similar components 822, 824, 826, 828 as on initiator node 206, along with an Init module 830. VpExit modules 808 and 828 are responsible for manipulating VProcess 802 and 822 interactions across their respective virtualization boundaries.

Referring now to FIG. 8B, in step 832, the acceptor Init module 830 receives a 'hello function' designating the address space from initiator Runtime 804. In step 834, acceptor Init module 830 sends a 'create VpExit' message to acceptor Bootstrap module 826. In step 836, acceptor Init module 830 sends an acknowledgment regarding the address space message back to initiator node 206. At this point, a synchronized address space is established between the initiator 207 and acceptor 208.

Referring to FIG. 8C, in step 838, initiator node 206 sends a 'create VpExit' message to initiator Bootstrap module 806. In step 840, initiator node 206 sends a 'create' message to VProcess 802 of initiator node 206, which receives a 'load VpExit' message in step 842 from initiator 206. At this point, VProcess 802 is created outside of the Remote Procedure Call (RPC) layer, and the resources that VProcess 802 uses are virtualized. In step 844, VProcess 802 sends a 'Mmap' message to VpExit module 808 of initiator node 206, which sends a 'mmap' message in step 845 to initiator 206 and an 'update the address map' message in step 846 to Bootstrap module 826 of acceptor node 208. In step 848, Bootstrap module 826 of acceptor node 208 sends an acknowledgment ('ok') back to initiator node 206, which relays the message in step 850 to VpExit module 808, which relays the message to VProcess 802 in step 852. At this point, the address map of the application on the initiator is made coherent with the acceptor node.

Referring to FIG. 8D, in step 854, initiator VProcess 802 sends a 'VpExit(Enter, hook_page)' message to VpExit module 808. In step 856, VpExit module 808 sends an 'Enter(hook_page)' message to initiator Bootstrap module 806. In step 858, initiator Bootstrap module 806 sends a 'create(VpExit)' message to initiator Runtime 804. In step 860, initiator Bootstrap module 806 sends a 'bootstrap (Runtime, hook_page)' message to acceptor Bootstrap module 826, which sends in step 862 an 'install(VpExit, hook_page)' message to acceptor Runtime module 824. In step 864, acceptor Runtime module 824 sends an 'install (VpExit)' message to acceptor VProcess 822. In step 866, acceptor Bootstrap module 826 sends a 'Runtime' message to initiator Bootstrap module 806, which returns in step 868 to VpExit module 808, which returns in step 870 to VProcess 802. At this point, initiator node 206 and acceptor node 208 have both created runtimes for VProcess 802, VProcess 822, and the memory and address space for VProcess 802 and 822 are coherent.

During bootstrap, initiator node 206, in one embodiment, uses the system 'ptrace' facility to intercept system calls generated by the virtual process. The application monitor runs in the same address space as the virtual process, which means that the application monitor is in the same physical process as the virtual process. In one embodiment, Linux's clone(2) system call allows the virtual process to be traced. The virtual process issues SIGSTOP to itself, which pauses execution of the virtual process before allocating any virtual process resources. The application monitor attaches to the virtual process via 'ptrace', which allows it to continue execution (using SIGCONT) from the point at which the virtual process entered SIGSTOP. Using 'ptrace', the application monitor can intercept and manipulate any system calls issued by the virtual process to preserve the virtualization boundary. After bootstrap, VProcess interactions with the operating system are detected by the syscall intercept library.

Figure 9:
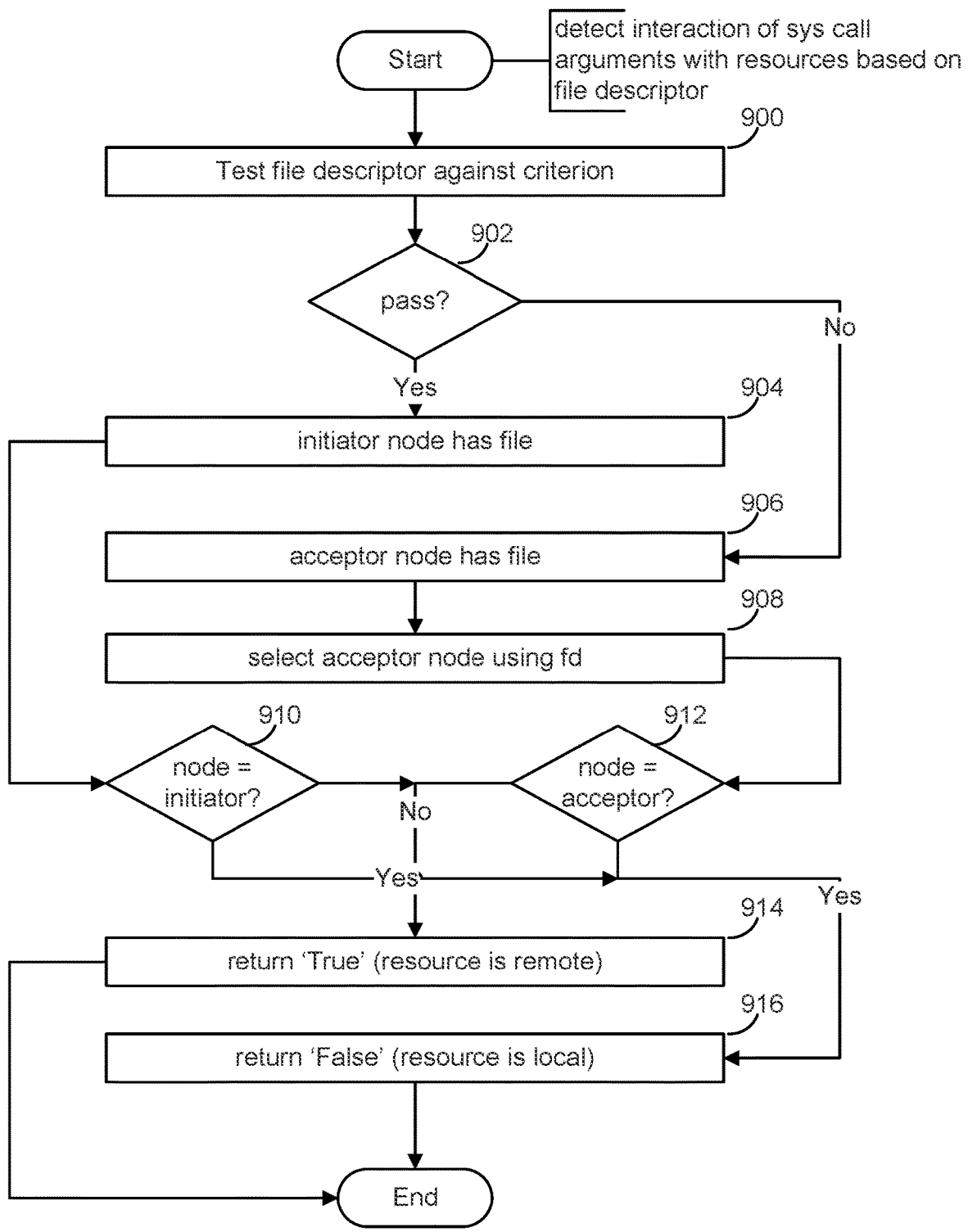
FIG. 9 depicts a flow of operations for accessing a file, according to an embodiment.

FIG. 9 depicts a flow of operations for accessing a file, according to an embodiment. As mentioned above, a file system resides on each of the nodes. Access to one or more files in the file systems may be requested by the application during execution by making a system call. If the requested file resides on a node making the system call, the file is available locally. However, if the file resides on a different node (another acceptor node or the initiator node), the system call is remotely executed according to FIGS. 6A-6C. According to step 655 of FIG. 6C, the system call determines whether the arguments of the system call interact with a remote pinned resource, which is a file that is not local to the node receiving the system call. The steps of FIG. 9 depict the use of the file descriptor, which was returned during a previous system call in which the file was opened to determine which node on which the system call is to be executed.

Referring to FIG. 9, in step 900, the flow tests the file descriptor against a criterion. In one embodiment, the criterion is whether the file descriptor obtained in step 654 of FIG. 6C (during an open(filename) or other system call which returns the file descriptor fd) is even or not. If the file descriptor is an even integer, as determined in step 902, initiator node 206 is determined to have the file in step 904 because only files with even fds can be stored on the initiator. If the current node is initiator node 206, as determined in step 910, then a 'False' value is returned in step 916. The 'False' value indicates that the system call arguments do not interact with a remote pinned resource, and the system call is handled locally. If the current node is acceptor node 208 as determined in step 912, then a 'True' value is returned in step 914. The 'True' value indicates that the system call arguments do interact with a remote pinned resource, and the system call is to be handled remotely.

If the file descriptor is an odd integer, then acceptor node 208 is determined to have the file in step 906 because only files with an odd fds can be stored on the acceptor node, and in step 916, a 'False' value is returned, where an odd fd is one that is odd modulo the number of acceptor nodes (i.e., odd=fd mod #acceptors). Otherwise, a 'True' value is returned in step 914, where 'False' indicates the needed resource is local and a 'True' indicates that the needed resource is remote.

In an alternative embodiment, the criterion is whether the file descriptor is less than a specified integer, say 512. If so, as determined in step 902, initiator node 206 is determined to have the file in step 904 because only files with fds less than 512 are stored on the initiator. If the current node is initiator node 206, as determined in step 910, then a 'False' value is returned in step 916. The 'False' value indicates that the system call arguments do not interact with a remote pinned resource, and the system call is handled locally. If the current node is acceptor node 208 as determined in step 912, then a 'True' value is returned in step 914. The 'True' value indicates that the system call arguments do interact with a remote pinned resource, and the system call is to be handled remotely.

If the file descriptor is greater than 512, then acceptor node 208 is determined to have the file in step 906 because only files with fds greater than 512 are stored on the acceptor node, and in step 916, a 'False' value is returned. Otherwise, a 'True' value is returned in step 914.

Certain embodiments as described above involve a hardware abstraction layer on top of a host computer. The hardware abstraction layer allows multiple contexts to share the hardware resource. These contexts are isolated from each other in one embodiment, each having at least a user application program running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application program runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application program and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application program's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained only to use a defined amount of resources such as CPU, memory, and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations, including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system. Computer-readable media may be based on any existing or subsequently developed technology for embodying computer programs in a manner that enables them to be read by a computer. Examples of a computer-readable medium include a hard drive, network-attached storage (NAS), read-only memory, random-access memory (e.g., a flash memory device), a CD (Compact Discs)-CD-ROM, a CDR, or a CD-RW, a DVD (Digital Versatile Disc), a magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for executing an application over a plurality of compute nodes, each of which includes a processor and a memory and has an application monitor and a runtime environment that are being executed in the processor thereof, wherein the plurality of nodes includes a first node and a second node, the method comprising:

establishing first threads in the runtime environment of the first node and establishing second threads in the runtime environment of the second node, wherein the first threads each have a first stack provisioned in the memory of the first node and the second threads each have a second stack provisioned in the memory of the second node, and the application monitors operate a coherence protocol to maintain a consistent memory space for the first and the second stacks across the first and the second nodes;

executing the application by the first threads and the second threads, wherein the first threads include an active thread and the second threads include a shadow thread that is formed by the second node based on the active thread in response to a command to form a coherent execution thread by the first node, and the active thread is in a running state and the shadow thread is in a parked state; and while executing the application, migrating by the application monitors, a workload of the active thread from the first node to the second node for execution by the shadow thread, said migrating including pausing execution of the workload in the active thread, sending a register state of said active thread from the first node to the second node, setting said active thread to the parked state, and then receiving the register state of said active thread sent by the first node at the second node, setting said shadow thread to the running state, and executing the workload in the shadow thread that is running based on the received registered state, wherein the application monitors migrate the workload of the active thread from the first node to the second node when the active thread accesses a memory page that cannot be migrated from the second node to the first node and the second node has the memory page.

2. The method of claim 1, wherein the application monitors migrate the workload of the shadow thread from the second node back to the first node after having migrated the workload of the active thread from the first node to the second node, for execution by the active thread, by setting said active thread to the running state and setting said shadow thread to the parked state.

3. The method of claim 2, wherein after having migrated the workload of the active thread from the first node to the second node, the first node waits for a message from the second node to migrate the workload of the shadow thread from the second node back to the first node, and in response to the message, the application monitor of the first node sets the active thread to the running state, and the application monitor of the second node sets the shadow thread to the parked state.

4. The method of claim 1, further comprising:

encountering a fault when a memory page of one of the second stacks is accessed by a corresponding one of the second threads and the memory page is not present in the second node;

requesting the memory page from the first node;

pausing the corresponding one of the second threads until the requested memory page is received; and re-activating the corresponding one of the second threads when the requested memory page is present in the second node.

5. The method of claim 1, further comprising:

encountering a fault when a memory page is accessed by one of the second threads and the memory page is not present in the second node;

requesting the memory page from the first node;

pausing the one of the second threads until the requested memory page is received; and re-activating the one of the second threads when the requested memory page is present in the second node.

6. A system for executing an application over a plurality of nodes each including a hardware platform, the system comprising:

a first node including a first processor and a first memory and having a first runtime environment and a first application monitor that are being executed in the first processor, the first runtime environment of the first node having first threads for executing the application; and a second node including a second processor and a second memory and having a second runtime environment and a second application monitor that are being executed in the second processor, the second runtime environment of the second node having second threads for executing the application, wherein the first threads each have a first stack provisioned in the first memory and the second threads each have a second stack provisioned in the second memory, and the first and the second application monitors operate a coherence protocol to maintain a consistent memory space for the first and the second stacks across the first and the second nodes, and wherein the first threads include an active thread and the second threads include a shadow thread that is formed by the second node based on the active thread in response to a command to form a coherent execution thread by the first node, and the active thread is in a running state and the shadow thread is in a parked state, and during execution of the application, the first and the second application monitors migrate a workload of the active thread from the first node to the second node for execution by the shadow thread, by pausing execution of the workload in the active thread, sending a register state of said active thread from the first node to the second node, setting said active thread to the parked state, and then receiving the register state of said active thread sent by the first node at the second node, setting said shadow thread to the running state, and executing the workload in the shadow thread that is running based on the received registered state, wherein the first and the second application monitors migrate the workload of the active thread, from the first node to the second node when the active thread accesses a memory page that cannot be migrated from the second node to the first node and the second node has the memory page.

7. The system of claim 6, wherein the second runtime environment during execution of the application performs the steps of:

encountering a fault when a memory page of one of the second stacks is accessed by a corresponding one of the second threads and the memory page is not present in the second node;

requesting the memory page from the first node;

pausing the corresponding one of the second threads until the requested memory page is received; and re-activating the corresponding one of the second threads when the requested memory page is present in the second node.

8. The system of claim 6, wherein the second runtime environment during execution of the application performs the steps of:

encountering a fault when a memory page is accessed by one of the second threads and the memory page is not present in the second node;

requesting the memory page from the first node;

pausing the one of the second threads until the requested memory page is received; and re-activating the one of the second threads when the requested memory page is present in the second node.

9. The system of claim 6, wherein the application monitors migrate the workload of the shadow thread from the second node back to the first node after having migrated the workload of the active thread from the first node to the second node, for execution by the active thread, by setting said active thread to the running state and setting said shadow thread to the parked state.

10. The system of claim 9, wherein after having migrated the workload of the active thread from the first node to the second node, the first node waits for a message from the second node to migrate the workload of the shadow thread from the second node back to the first node, and in response to the message, the application monitor of the first node sets the active thread to the running state, and the application monitor of the second node sets the shadow thread to the parked state.

11. A non-transitory computer-readable medium comprising instructions, which when executed in a plurality of compute nodes, each of which includes a processor and a memory and has an application monitor and a runtime environment that are being executed in the processor thereof, cause the computer nodes to carry out a method for executing an application, the method comprising:

establishing first threads in the runtime environment of the first node and establishing second threads in the runtime environment of the second node, wherein the first threads each have a first stack provisioned in the memory of the first node and the second threads each have a second stack provisioned in the memory of the second node, and the application monitors operate a coherence protocol to maintain a consistent memory space for the first and the second stacks across the first and the second nodes;

executing the application by the first threads and the second threads, wherein the first threads include an active thread and the second threads include a shadow thread that is formed by the second node based on the active thread in response to a command to form a coherent execution thread by the first node, and the active thread is in a running state and the shadow thread is in a parked state; and while executing the application, migrating by the application monitors, a workload of the active thread from the first node to the second node for execution by the shadow thread, said migrating including pausing execution of the workload in the active thread, sending a register state of said active thread from the first node to the second node, setting said active thread to the parked state, and then receiving the register state of said active thread sent by the first node at the second node, setting said shadow thread to the running state, and executing the workload in the shadow thread that is running based on the received registered state, wherein the application monitors migrate the workload of the active thread from the first node to the second node when the active thread accesses a memory page that cannot be migrated from the second node to the first node and the second node has the memory page.

12. The non-transitory computer-readable medium of claim 11, wherein the application monitors migrate the workload of the shadow thread from the second node back to the first node after having migrated the workload of the active thread from the first node to the second node, for execution by the active thread, by setting said active thread to the running state and setting said shadow thread to the parked state.

13. The non-transitory computer-readable medium of claim 12, wherein after having migrated the workload of the active thread from the first node to the second node, the first node waits for a message from the second node to migrate the workload of the shadow thread from the second node back to the first node, and in response to the message, the application monitor of the first node sets the active thread to the running state, and the application monitor of the second node sets the shadow thread to the parked state.

14. The non-transitory computer-readable medium of claim 11, wherein said method further comprises:

encountering a fault when a memory page of one of the second stacks is accessed by a corresponding one of the second threads and the memory page is not present in the second node;

requesting the memory page from the first node;

pausing the corresponding one of the second threads until the requested memory page is received; and re-activating the corresponding one of the second threads when the requested memory page is present in the second node.

15. The non-transitory computer-readable medium of claim 11, wherein said method further comprises:

encountering a fault when a memory page is accessed by one of the second threads and the memory page is not present in the second node;

requesting the memory page from the first node;

pausing the one of the second threads until the requested memory page is received; and re-activating the one of the second threads when the requested memory page is present in the second node.

* * * * *